(12) United States Patent
Evans et al.

(10) Patent No.: US 11,176,265 B2
(45) Date of Patent: Nov. 16, 2021

(54) DATA-CENTRIC INTERACTIVE DATA SECURITY SYSTEM

(71) Applicant: Stash America LLC, Las Vegas, NV (US)

(72) Inventors: Christopher Evans, Las Vegas, NV (US); Janine Darling, Las Vegas, NV (US); Paul Twomey, Las Vegas, NV (US)

(*) Notice: Subject to any disclaimer, the term of this patent is extended or adjusted under 35 U.S.C. 154(b) by 111 days.

(21) Appl. No.: 16/721,358

(22) Filed: Dec. 19, 2019

(65) Prior Publication Data

US 2020/0193048 A1    Jun. 18, 2020

Related U.S. Application Data

(63) Continuation-in-part of application No. 15/857,797, filed on Dec. 29, 2017, now Pat. No. 10,630,652.

(51) Int. Cl.
| | |
|---|---|
| *G06F 21/62* | (2013.01) |
| *H04L 9/06* | (2006.01) |
| *H04L 9/32* | (2006.01) |
| *H04L 9/08* | (2006.01) |
| *H04L 29/06* | (2006.01) |
| *H04L 29/08* | (2006.01) |

(52) U.S. Cl.
CPC ........ *G06F 21/6218* (2013.01); *H04L 9/0643* (2013.01); *H04L 9/0861* (2013.01); *H04L 9/3239* (2013.01); *H04L 67/1097* (2013.01); *H04L 63/166* (2013.01)

(58) Field of Classification Search
CPC ...... H01S 5/0422; H01S 3/137; H01S 3/1062; H01S 3/0637; H01S 3/30; H01S 3/083; H01S 5/068; H01S 5/1071; H01S 5/026
See application file for complete search history.

(56) References Cited

U.S. PATENT DOCUMENTS

| | | | |
|---|---|---|---|
| 7,089,322 B1* | 8/2006 | Stallmann | G06Q 20/20 705/14.34 |
| 9,800,579 B2* | 10/2017 | Bao | H04L 63/0435 |
| 2002/0176575 A1* | 11/2002 | Qawami | G11B 20/00362 380/201 |
| 2007/0077925 A1* | 4/2007 | Hiyama | H04M 1/66 455/420 |
| 2008/0022135 A1* | 1/2008 | Gaya | H04L 67/06 713/193 |

(Continued)

*Primary Examiner* — Mohammed Waliullah
(74) *Attorney, Agent, or Firm* — John L. Sotomayor

(57) ABSTRACT

Current data archiving and storage solutions seek to store data in the most accessible manner possible, often foregoing security for sake of user convenience. The technology, system, and methods proposed in this document seek to protect data in a highly resilient, secure manner, suitable for extremely long-term periods of time without loss of data integrity. The proposed solution includes methods for storing digital data, validating the integrity of the data on both sides of the transmission, encryption with keys that only the user has access to, splitting files into obfuscated slices for increased security, and determining the most effective storage location according to a novel cost metric. Data is reduced to ephemeral "ghost" files that remain faithful copies of the original data files, capable of being perceived by a user device, but never resident upon the device.

9 Claims, 6 Drawing Sheets

(56) References Cited

U.S. PATENT DOCUMENTS

| | | | |
|---|---|---|---|
| 2008/0152149 A1* | 6/2008 | Bauchot | H04L 63/064 380/279 |
| 2013/0305039 A1* | 11/2013 | Gauda | G06F 21/6218 713/153 |
| 2015/0339930 A1* | 11/2015 | McCann | G08G 5/006 701/528 |
| 2019/0296900 A1* | 9/2019 | Sitges Puy | G06F 21/6245 |

* cited by examiner

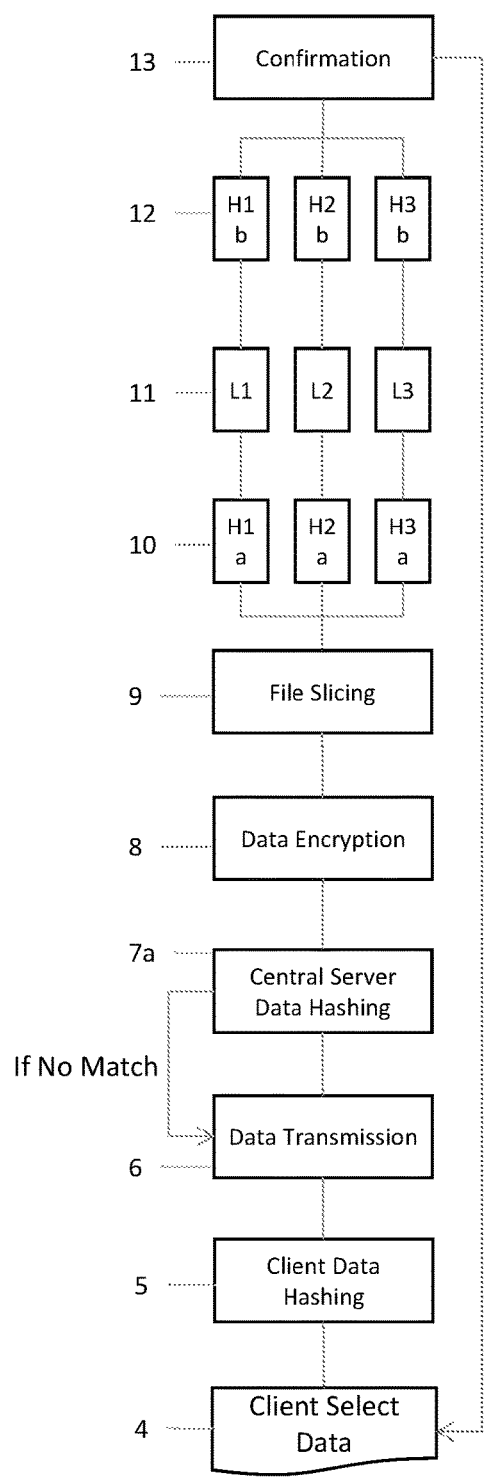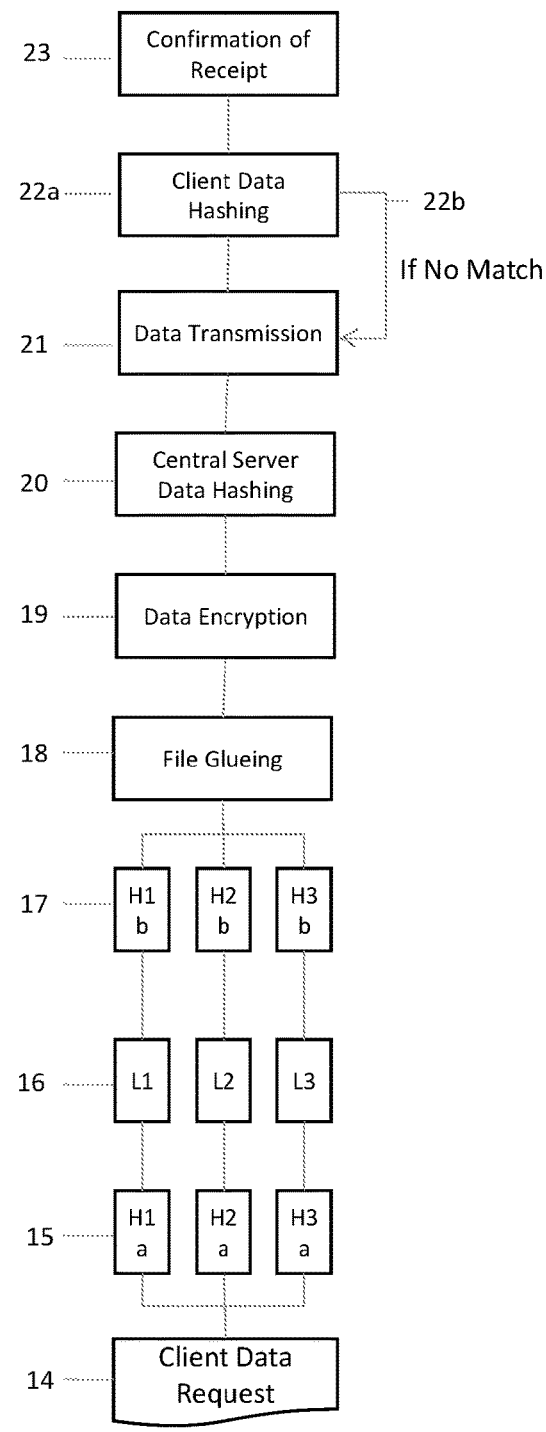
Figure 002
Figure 003

DATA-CENTRIC INTERACTIVE DATA SECURITY SYSTEM

CLAIM TO PRIORITY

This application claims under 35 U.S.C. § 120, the benefit of priority as a Continuation-in-Part of the application Ser. No. 15/857,797, filed Dec. 29, 2017, titled "Data-Centric Secure Data Technology, Archiving, and Storage System" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Attacks targeting non-structured data on systems continue to occur. Attackers repeatedly compromise information on corporate, government, and personal computers despite new advances in computer security such as firewalls, intrusion detection systems, and other technologies. The underlying problem is that the data is not kept in a secure manner; and only by securing the data at the lowest level possible can attacks against data be stopped.

Other data storage solutions seek to store massive amounts of data in the most accessible manner possible, often foregoing security measures for sake of convenience, ease of use, or accessibility. Network attached storage, local storage, and file system connected data storage methods are dependent on the Operating System to provide users access to their files. This dependence introduces another, significant, attack vector that can be exploited to compromise data. Other methods and tools do not store data in a secure format, leaving the data open to be compromised through attacks against the storage medium itself.

Data security and data integrity are integral to network and computer security. Although numerous systems have been created to address these factors, data security breaches continue to occur.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 2 is a view of the data storage and archiving process consistent with certain embodiments of the present invention.

FIG. 3 is a view of the data retrieval process consistent with certain embodiments of the present invention.

DETAILED DESCRIPTION

Figure 1:
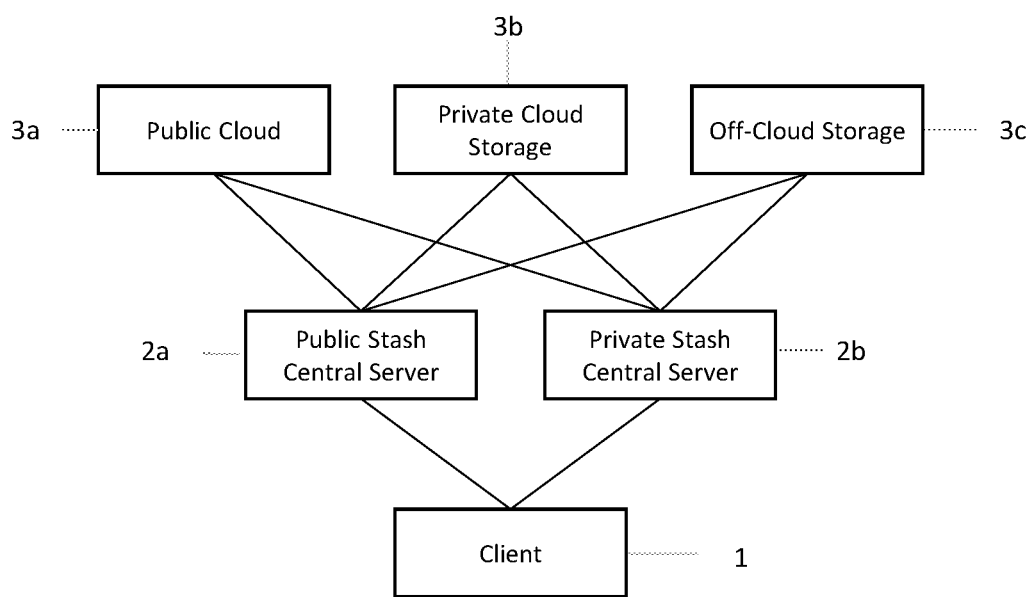
FIG. 1 is a view of the system architecture with deployment and file storage options consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference herein to "Ghost File" or "Ghost Files" refer to one or more data files with restricted permissions, where the restriction is that such files may be placed only in volatile memory.

Reference herein to "Ghost File Process" refers to a halting/lock-step process that includes interrupting interaction between an Operating System and Input/Output (I/O) system fulfillment.

Reference herein to "Protected Location" or "Protected Locations" refer to data storage locations in which the stored data is protected by implementation of a Ghost File Process.

This document discloses embodiments that relate to network and computer security for data security and data integrity. These embodiments may take the form of providing for the data-centric protection, security, integrity, archiving, and storage of data committed to computer networks in any storage form or format.

In an embodiment of the invention, a system and method for securing and storing data in such a manner that makes it unreadable in its constituent parts (or slices) is proposed. This system is referred to herein as "Data-Centric Secure Data Storage System." The system delivers a secure archiving and storage solution for data files of any kind. The system provides a user interface to add files, and access, modify, or delete files. The system uses secure methods to receive files, and to ensure the integrity of the file matches the original file provided, encrypts the file with a file encryption key that is generated on-demand, splits the encrypted data file into an arbitrary number of slices, and finally copies the files to secure data storage and archiving locations according to a defined storage algorithm based on metrics related to geographic location, storage location cost, data transmission cost, and/or distribution pattern. The system reverses this process when a retrieval request is made. The system retrieves the slices, reassembles the slices, generates the user-specific file decryption key on-demand, decrypts the file, and presents the decrypted file it in its original format to the user.

The embodiment provides for data security and data integrity by calculating a total cost metric for data storage. The total cost metric may be composed of the storage location cost, the data transmission cost, and any cost associated with providing for a particular distribution pattern for data slice dispersion. The storage determination may be optimized through use of a metric to determine the number of data slices based on maximizing the number of slices and optimizing the speed of copying the slices to arbitrary data storage locations. Further, the process provides for storage of the reassembly information with the data slices themselves rather than in a central location. This embodiment achieves speed improvements through encrypting the data file first, rather than creating slices of the data file and subsequently encrypting the individual slices.

In an embodiment, the system may be implemented through various architectural configurations with a central server and file slice storage and archiving locations that may be co-located with the central server or remotely located through network connections to other servers and storage locations. The system may use a centralized public cloud server using public cloud storage locations for the individual slices. Alternatively, the system may utilize a private cloud or dedicated hardware server for the central server, and private cloud storage or local, off-cloud storage for the individual slices.

In an embodiment, a device associated with an end user may interact with the central server and initiate transfers to, and request transfers of digital data from, the central server. The end-user device may be implemented as a mobile device such as cell, mobile, or smartphone, a tablet form factor device, a laptop form factor device, a desktop form factor device, a network computer form factor device, or any similar end-user client device having network communication capability either through wired or wireless connections. The end-user device may also be implemented as a server form factor device.

In an embodiment of the invention, a Client may select a digital file, or files, accessible from their system on local storage device co-located with the Client, a remote storage device, or cloud storage device, and trigger the file transmission and secure storage method. This method can be initiated through a Client request, for example, a user logging into the web application and starting a file transfer. It could also be initiated through an Application Programming Interface (API) on behalf of a user through another application.

In an embodiment, the Client instructs the system to compute a hash, or a one-way, unique representation of the digital file(s). This hash is computed over a representative sample of the digital file, with a minimum of the first part of the digital file and the last part of the digital file, with parts of arbitrary size, all the way up to a maximum of the hash being computed over the entire digital file. This hash is computed using existing methods such as, but not limited to MD5, SHA1, RIPEMD, SHA256, or any other hash computation method preferred for implementation, and is performed by Client directed software modules or devices which support these functions. This hash is securely transmitted to the central server.

The Client instructs the system to send the contents of the digital file(s) via secure methods to the central server. The file is deconstructed into blocks for transmission by the Client device web browser, application programming interface, or other method as supported by the Client directed software module or device. The blocks are transmitted to the central server through secure methods using Transport Layer Security (TLS) or Secure Sockets Layer (SSL) technology. The current prototype mode of implementation uses HTML5 within the Client web browser to deconstruct the digital file(s) into blocks and transmits them via a TLS protected communication pathway with the central server.

Upon receipt of the file from the Client, the central server computes a hash, or a one-way, unique representation of the digital file(s). This hash is computed over a representative sample of the digital file(s) with a minimum of the first part of the digital file and the last part of the digital file, with the parts being of arbitrary size, up to a maximum of the hash being computed over the entire digital file(s). This hash is computed using existing methods such as, but not limited to MD5, SHA1, RIPEMD, SHA256, etc., and is performed by a central server. This hash is used to identify the file on the central server, and the file(s) is/are named with this hash. The advantage of calculating a hash on a representative sampling of the file is speed improvements over calculating the hash of the entire file. The implementation is through use of server-side PHP functions in the web application to calculate the hash of the file.

The central server uses a split-key method that requires two proto-keys to be combined into a single key for encrypting or decrypting files. Each user has a unique file encryption proto-key and the central server has another proto-key, the unique file encryption proto-key and the central server proto-key are combined, on-demand, to create the file encryption key. This file encryption key is then used to encrypt the digital file(s) transmitted by the client, after which, it is destroyed. The implementation uses publicly available AES-256 algorithm to encrypt the digital file(s) with the on-demand generated file encryption key.

The encrypted data file(s) on the central server are split into an arbitrary number of slices. The number of slices is determined by a storage cost metric, further described below. The central server splits the data file(s) into the determined number of slices, as equal in size as possible, and writes the instructions for recombining the slices into each slice, such that the central server can recombine the slices.

The central server uses a framework for identifying slice storage locations that allows new storage locations to be added or removed with ease. Each storage location is identified to the central server through use of four key functions: 1) upload, 2) download, 3) delete, and 4) "deleteLocation". The upload function contains methods specific to the storage location for transmitting or otherwise writing the slice from the central server to the storage location. The download function contains methods specific to the storage location for receiving or otherwise reading the slice from the storage location to the central server. The delete function contains methods specific to the storage location for securely removing a file from the storage location. The "deleteLocation" function contains methods specific to the storage location for removing any user specific identifiers and all data from the storage location. Each storage location also has a cost metric associated, as calculated through a number of parameters, identified in a separate section. The implementation is through a PHP web application with the details of each location stored in a database on the central server.

The system uses a cost function to determine where to store the slices. The cost function is comprised of several metrics which are separately weighted to determine the overall cost of storing a slice in a particular location. The following metrics are used in the function:

Location storage cost, as dollars per Gigabyte of storage, based on costs from the file location storage provider.

Slice transmission cost, as dollars per Gigabtye of bandwidth, from the service provider.

Slice transmission time, reflecting the response time between the central server and the file storage location.

Entropy, as a weighted value, reflecting the desired number of slices and storage method (single location, round robin, or random) to ensure sufficient security of the original digital file; prioritizes storage costs over transmission costs.

Frequency of access, as a weighted value, reflecting the expected frequency the digital file comprised of the slices, will be requested by the Client; prioritizes transmission cost and response times over storage costs.

Responsiveness, as a weighted value, reflecting the responsiveness of the storage location as measured by the time to live (TTL), or round trip time (RTT), or other measurement of communication pathway speed.

The metrics are reflected in the following function which determines the cost for use of a specific storage location:

$$Cost_{sl} = (StorageCost_{sl}/max(StorageCosts_{sl1}, \ldots, StorageCost_{sln}))*Entropy + (TransmissionCost_{sl}/max(TransmisionCost_{sl1}, \ldots, TransmissionCost_{sln}))*Frequency + (Speed/max(Speed_{sl1}, \ldots, Speed_{sln}))*Responsiveness$$

Additional parameters that may be combined with the above cost algorithm may include geographic location and geographic boundary constraints. Including these parameters may provide for additional total cost refinement.

Upon determination of all of the slice locations, the central server uses the upload function within the file storage framework to determine the methods for transmitting or writing the encrypted slices to their respective locations. If the storage location is separate from the central server and remotely accessible via a network, the central server uses secure methods to transmit the files. In the case of local storage, where the location is a part of the server, or available through a closed bus (e.g. USB, fiber channel, etc.) the central server will use file copy methods within the central server to write the data to the file storage location. The current prototype mode of implementation uses Transport Layer Security (TLS) or Secure Sockets Layer (SSL) and web-enabled HTML POST methods to copy the slices from the central server to the file storage location.

The system presents the user with a view of all the files stored on their behalf, regardless of the actual storage location and the number of slices involved. A user may perform rudimentary file operations on each file such as download/read, copy, move, and rename. The user sees the original file name for each file they stored within the system while each of the files and each slice is given a globally separate and unique name.

When the system receives an identifier for a file selected for download by a user, the central server initiates a download request from the file storage location for each of the slices which constitute the requested file. The central server uses the download function within the file storage framework to determine how to retrieve the slices from the file storage location(s). The central server downloads the file slices and writes them to a temporary storage location on the central server. This transmission is done in a secure manner using a protected communication path through use of Transport Layer Security (TLS), or Secure Sockets Layer (SSL) encryption. The implementation is through a PHP web application running on the central server.

The central server reads the instructions from each of the slices to determine instructions for reassembling the file slices back into the original, encrypted file(s). The instructions may include ordering and transformative steps in order to return the file(s) to their complete encrypted state. Once reassembled, the file slices are securely deleted from the central server. The implementation is through a PHP web application running on the central server.

The central server decrypts the file(s) using a split-key method that requires two proto-keys to be combined into a single decryption key. Each user has a unique file decryption proto-key and the central server has another proto-key. They are combined, on-demand, to create the file decryption key. This file decryption key is then used to decrypt the digital file(s), after which, it is destroyed. The implementation uses publicly available AES-256 algorithm to decrypt the digital file(s) with the on-demand generated file encryption key.

Upon decrypting the digital file(s), the central server computes a hash, or a one-way, unique representation of the digital file(s). This hash is computed over a representative sample of the digital file(s) with a minimum of the first part of the digital file and the last part of the digital file, with the parts being of arbitrary size, up to a maximum of the hash being computed over the entire digital file(s). This hash is computed using existing methods such as, but not limited to MD5, SHA1, RIPEMD, SHA256, etc., and is performed by central server. This hash is used to identify the file on the central server, and the file(s) is/are named with this hash. The advantage of calculating a hash on a representative sampling of the file is speed improvements over calculating the hash of the entire file. If the computed hashes match the record of the original file, the reconstructed and decrypted file is a representation of a duplicate of the original file. An additional improvement over current processes is that the decryption process and hash calculations are done in blocks, with each block being immediately transmitted to the Client device that initiated the request. In this manner, no unencrypted data is written to the central server location, minimizing the risk of the contents of the original digital file(s) being compromised. The implementation is through use of server-side PHP functions in the web application to calculate the hash of the file.

The central server delivers the digital file(s), decrypting and hashing each block on the fly, before transmitting it via a secure communication path back to the Client device.

The system associated with the Client is instructed by the central server to compute a hash, or a one-way, unique representation of the digital file(s). This hash is computed over a representative sample of the digital file with a minimum of the first part of the digital file and the last part of the digital file, with the parts being of arbitrary size, all the way up to a maximum of the hash being computed over the entire digital file. This hash is computed using existing methods such as, but not limited to MD5, SHA1, RIPEMD, SHA256, or any currently available hash calculation method, and is performed by Client devices which support these functions. This hash is securely transmitted to the central server and the Client notified when the reassembly, decryption, and transmission of the file is successful. The implementation is through use of Client-side javascript to calculate the hash of the file.

In an embodiment, a system is herein described for secure data storage and retrieval, consisting of a processor having network connections to a plurality of networked storage locations where the processor receives one or more data files from a user through a network connection. The system encrypts one or more data files and generates an identifier for each encrypted data component. The system then splits the one or more encrypted data files into smaller data components which are herein known as slices. The system may calculate the transmission path cost from said processor to each of said plurality of networked storage archives and store each identifier for each encrypted data component in an electronic storage element associated with said processor. The system may store each encrypted data component into one of the plurality of networked storage locations based upon a set of calculated storage and data transmission costs and later retrieve each encrypted data component upon user request. The system may combine said data components into said one or more encrypted data files, and decrypt each encrypted data file into the file originally received from a user. The system may create faithful copies of each data component and permit access to and interaction with each faithful copy only via volatile memory. Upon decryption, the system may verify the data integrity of the one or more data files after said combining, and deliver the one or more data files to the user in the original form and format.

In an embodiment, the encryption and decryption of the one or more data files are performed using two unique keys, where said two unique keys are generated when encryption or decryption is performed, combined using a hashing algorithm, and destroyed once encryption or decryption is complete. The file splitting is performed by a set of algorithms where at least one of said set of algorithms splits the one or more data files into a number of smaller components of as equal size as possible, where the smaller components are known as slices, and where said at least one of said set of algorithms records the instructions needed to recombine said smaller components into the original file within said smaller components prior to storing said smaller components. In this embodiment, an algorithm may perform the file splitting into a plurality of smaller components by calculating storage and data transmission costs which are at least partly comprised of dynamic values for location storage cost, transmission/bandwidth cost, transmission time, security entropy, frequency of access, and location responsiveness to determine the appropriate number of smaller components into which the one or more data files are split. The file combining is performed by interpreting the keying data contained within each of the smaller components and merging the smaller components in the proper order to recreate the original file.

In an embodiment, file storage locations are created and stored in the system with four key functions per location, which allows the system to treat each location in the same manner through upload, download, delete, and "deleteLocation" functions. The one or more data files are stored and retrieved from locations defined by an algorithm which calculates the most efficient storage location based at least in part on dynamic parameters of location storage cost, transmission/bandwidth cost, transmission time, security entropy, frequency of access, and location responsiveness. Multiple (N) storage locations are determined for storage, and from which the system can retrieve and reassemble an entire file, even if N–1 of the storage locations are inaccessible, to achieve resiliency across different storage location providers.

In an embodiment, the system creates new protected locations and converts existing locations in the end-user client file into protected locations based on end-user selection. The system provides for the creation and modification of a set of rule-based criteria for evaluating whether to permit or prevent user access. In an embodiment, the system monitors, records and reports on requests for creating, accessing and deleting data via push messaging, delayed batch reporting, local logging, and remote logging.

In an embodiment, data stored may be represented as a plurality of protected locations on the end-user system. From these protected locations, a representation of unstructured data files, distinctly not containing the original data files, is provided to an end-user by the Data-Centric Secure Data Storage System. This representation of the unstructured data file(s) requested by a user is held in volatile storage and serves as an intermediary location for interaction between the user and the data file, maintaining the security of the unstructured data through the Data-Centric Secure Data Storage System acting as an intermediary between the user and the secured original data files. Such representation is a Ghost File. The end-user may then access, interact with, modify, and save the data, thereby fulfilling end-user requests and providing a secure method for retrieving and storing the data without corruption of the original data files.

In an embodiment, a User Mode Application identifies locations, such as an originating hard drive, of existing data that is to be kept secure. The instant innovation creates protected locations and initiates monitoring of the one or more protected locations. The instant innovation transmits unsecure files from existing data locations, such as the originating hard drive or an electronic storage location remote from a user, to the Data-Centric Secure Data Storage System. The User Mode Application manages and monitors original data files, identifies where the original data files are stored, and copies file content from the Data-Centric Secure Data Storage System to a protected location.

Implementing a Ghost File Process, the Driver Mode Application communicates with the User Mode Application, retrieves original data stored in a Data-Centric Secure Data Storage System, and creates Ghost Files as a faithful representation of the data files requested by a user and transmits the created Ghost Files to a device associated with a user, locking such Ghost File data into volatile memory within the device associated with a user, where the device may be any of a computer, laptop, smartphone, tablet, server, or any system having a processor, memory, and a display element. Ghost Files are faithful copies of the original data files, but are short-lived, existing for the life of an interaction session with a user. The Ghost Files are not transferred to the disk storage of the device associated with the user, but are instead accessed only through active, volatile memory associated with the processor of the device associated with the user. In this way, Ghost Files are perceived by a user device, but are never resident upon the device, but do permit the user to interact with the data representation contained within the Ghost Files through the User Mode Application. The User Mode Application sends a monitoring request to the Driver Mode Application to establish the interaction between the user and the Ghost Files.

The end user may then interact with the Ghost Files as if said Ghost Files were in fact the original data files. Rather than accessing the originating hard drive, the data is received and/or sent via Ghost Files from and/or to protected locations. In the non-limiting example of an existing Microsoft Word document, the user sees a file on a desktop screen but what the user is actually viewing is a representative Ghost File of that file data maintained in a protected location—the originating data itself is in a Data-Centric Secure Data Storage System. In an embodiment, when the user requests a file by, in a non-limiting example, double clicking on a file icon, the instant system intercepts the Operating System's request for the data content of that file, retrieves the original file from the Data-Centric Secure Data Storage System, copies the original file to the protected location (thereby creating a Ghost File representation of that original file), passes the Ghost File representation to the Operating System, which passes it on to the application (in this example, Microsoft Word) which then displays the Ghost File representation to the user.

In an embodiment, the system monitors the plurality of protected locations for end-user requests of the data and intercepts user requests for interacting with the files in the protected location. A request may be, but is not limited to, copying, deleting, renaming, moving, viewing, editing, saving, or other data processing activities. Upon interception of the request, the instant system retrieves the data from a Data-Centric Secure Data Storage System, and provides a retrieved data representation via a Ghost File Process to fulfill the requested activity. The system prevents the protected data from being stored on the end-user device and only allows it to be accessed through volatile memory of the device associated with the user, significantly reducing attack vectors and opportunity for the data to be compromised by an attacker. In a non-limiting example, a current prototype mode of input/output control implementation is through use of shared processing of a Microsoft Windows file system application programming interface via a low level device driver software application and a separate software application to interact with the device driver at the user layer.

In an embodiment, the system, running on a device associated with an end user, provides representations of files for the user to interact with in a plurality of protected locations. The end-user device may be implemented as a mobile device such as a cell, mobile, or smartphone, a tablet form factor device, a laptop form factor device, a desktop form factor device, a network computer form factor device, or any similar end-user client device having network communication capability either through wired or wireless connections. The end-user device may also be implemented as a server form factor device.

In an embodiment, the system may be configured to convert existing, non-secure unstructured data stored in the file system on the end-client system, to a plurality of protected locations. In such a case, the proposed invention securely transmits data in the plurality of protected locations, for secure storage and archiving. Distributed data files may offer security levels heightened in proportion to the distance of their separation from one another and the end user.

In an embodiment, the system may be implemented through use of software running on various client platforms and relies on various architectural configurations described herein.

In an embodiment, prior to fulfilling the request for the data, the system may evaluate a set of rules permitting or preventing the fulfillment of the request based on the requested activity. The rules may be created and maintained as a stored file and accessed and interpreted by the proposed system as needed.

In an embodiment, the system may monitor, log, and report on any data requests through various architectural methods including, but not limited to push messaging, delayed batch reporting, local logging to a file, and remote logging to another system.

In an embodiment, the system provides methods for configuring the plurality of protected locations on the end-user system. In addition, methods are provided for configuring access to the Data-Centric Data Storage System locations. Further, methods are provided for configuring the access logging and access control rules enforced by the system.

Turning now to FIG. 1, this figure presents a view of the system architecture with deployment and file storage options consistent with certain embodiments of the present invention. In an exemplary embodiment, a client 1 may open communication with a private central server 2b containing an implementation of the secure data storage system. In an alternative embodiment, the client 1 may open communication with a public central server 2a in which an implementation of the secure data storage system has been installed and is operative. The client 1 may transmit one or more data files over the established network communication channel and instruct secure data storage system implemented on either the private central server 2b or the public central server 2a to initiate the secure data storage process.

In an embodiment, the secure data storage system may perform the hash, encryption, and slicing operations on the received data file(s) and transmit the results to a set of electronic storage repositories. The secure data storage system may transmit encrypted slices of the processed data file(s) to a storage repository located in the public cloud 3a, to a storage repository located in a private cloud storage system 3b, or may transmit the processed data file(s) to an off-cloud electronic storage repository 3c. Additionally, the secure data storage system may provide slices from a single transaction to more than one type of electronic storage repository, processing one or more data files and transmitting slices to the public cloud 3a, to the private cloud 3b, and to off-line storage 3c. In this manner, the secure data storage system may prevent discovery not only of the slices of the processed file(s), but may also make it more difficult to gather all of the slices from each electronic storage repository to which the slices have been entrusted.

Turning now to FIG. 2, this figure presents a view of the data storage and archiving process consistent with certain embodiments of the present invention. In an exemplary embodiment, the figure presents the data flow process when storing and archiving data within the system. The client selects the data 4 to be stored within the system. The client calculates a hash 5 of this data before transmitting it 6 to the Stash central server. The central server calculates a hash 7a of the received data, if the two hashes match, proceed to encrypt the data 8. If the hashes do not match, the client is instructed to resend the data 7b. Once the data is encrypted, the file is sliced 9 into a number of smaller data components upon which a hash is calculated for each of the smaller data components 10, hereinafter slices, the slices are transmitted to their respective storage locations 11, and another hash is performed on the slice in the storage location 12. If the hashes match, the client is informed of a successful storage/archiving process 13.

Turning now to FIG. 3, this figure presents a view of the data retrieval process consistent with certain embodiments of the present invention. In an exemplary embodiment, the figure presents the data flow process when retrieving data within the system. The client selects the data 14 to be retrieved from the system. The system determines the number and location of each of the slices of the original data file and calculates the hash 15 of each slice. The slices are retrieved from their respective storage locations 16, and another hash is calculated on the retrieved slices 17 to validate the integrity of the file slices. If the hashes do not match, the system will retrieve the affected slice again. The slices are then combined in a process referred to as "glueing" 18 and the file is then decrypted 19. The central server calculates another hash of the decrypted file 20 before transmitting it to the client 21. Upon receipt, the client calculates a hash 22a of the received file, and if the hashes do not match, the system resends the file to the client 22b. If the hashes do match, the client confirms receipt 23 of the original file.

Figure 4:
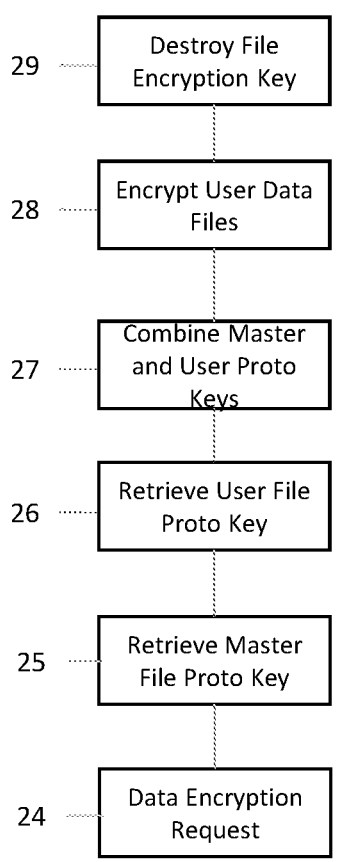
FIG. 4 is a view of the key generation and encryption process consistent with certain embodiments of the present invention.

Turning now to FIG. 4, this figure presents a view of the key generation and encryption process consistent with certain embodiments of the present invention. In an exemplary embodiment, a data encryption request 24 is initiated by the central server. The server retrieves the master file proto key 25 and retrieves the user's file proto key 26 from secure locations. These keys are combined into a sequence of characters that is unique to each user and then transformed into the user's file encryption key 27. The system encrypts the data 28 using the user file encryption key and then destroys the file encryption key 29, minimizing the time the encryption key is accessible to the system.

Figure 5:
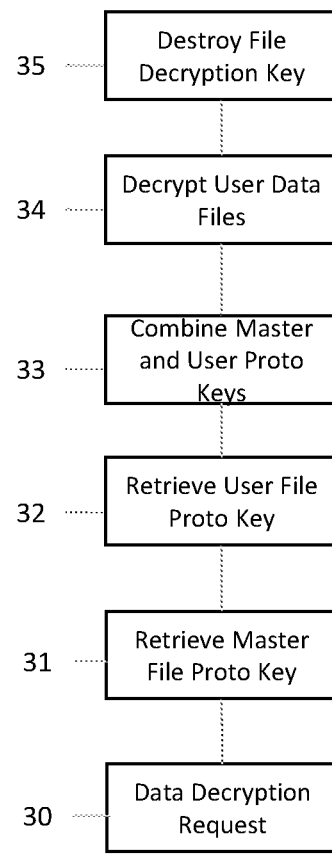
FIG. 5 is a view of the key generation and decryption process consistent with certain embodiments of the present invention.

Turning now to FIG. 5, this figure presents a view of the key generation and decryption process consistent with certain embodiments of the present invention. In this embodiment, a data decryption request 30 is initiated by the central server. The system retrieves the master file proto key 31 and the user file proto key 32 from secure locations. The system combines the two proto keys 33 into a sequence of characters that is unique to each user, and then transforms this sequence into the user's file decryption key. This key is then used to decrypt the data 34, after which, the system destroys the user file decryption key 35, minimizing the time the key is accessible to the system.

Figure 6:
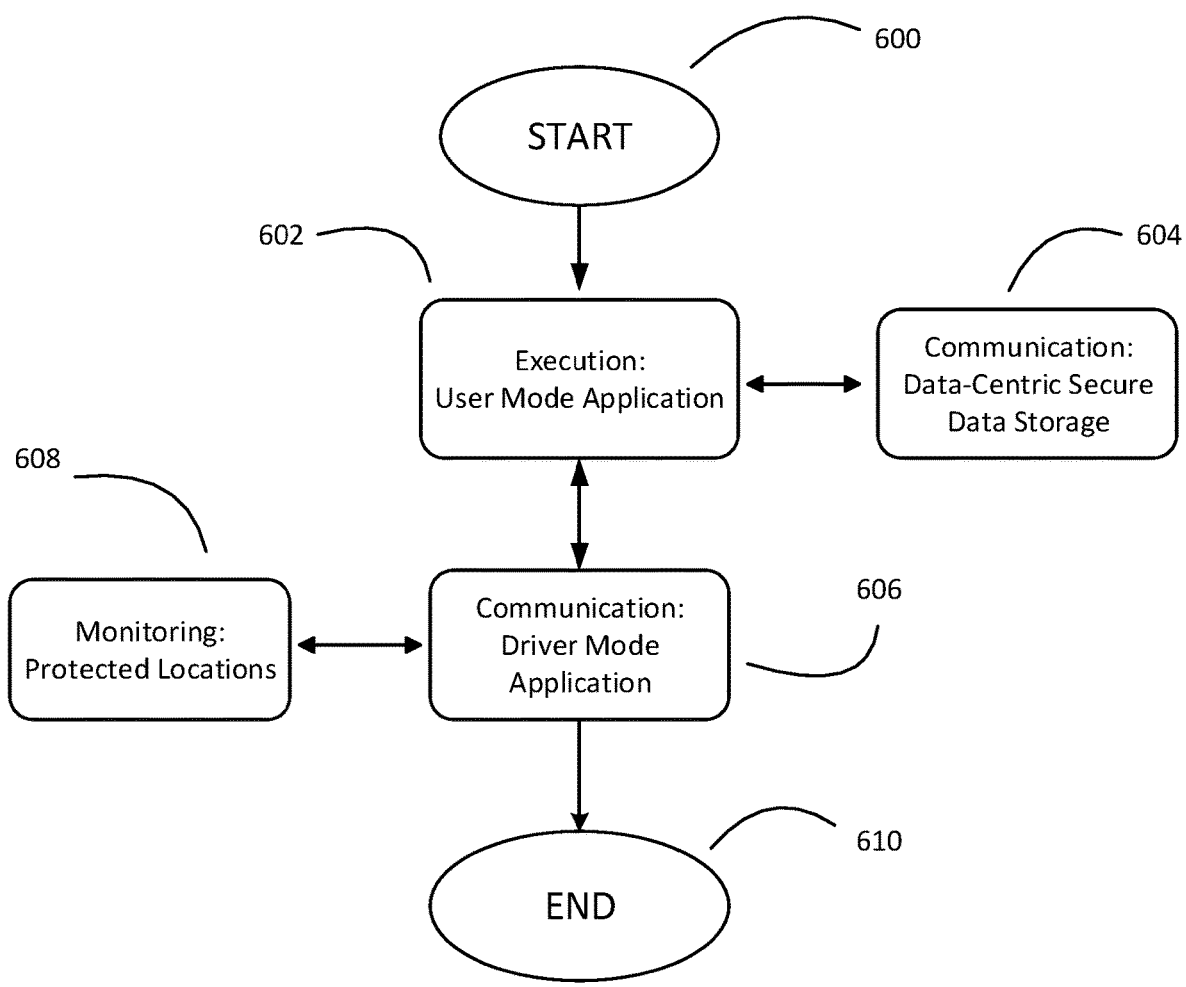
FIG. 6 is a process view of system architecture communication among protected locations, a User Mode Application and a system mode driver application consistent with certain embodiments of the present invention.

Turning now to FIG. 6, a process view of the system architecture communication among Protected Locations, a User Mode Application and a Driver Mode Application consistent with certain embodiments of the present invention is shown. The process begins at 600. At 602, the User Mode Application executes communication protocols, locating original data from unsecure locations and at 604 communicating such original data to a Data-Centric Secure Data Storage System and maintaining two-way communication with the Data-Centric Secure Data Storage System. At 606, the User Mode Application establishes and maintains two-way communication with the Driver Mode Application. At 608, the Driver Mode Application establishes and monitors end-user specified protected locations, changes in which are reported to the User Mode Application via its two-way communication with the Driver Mode Application. The process ends at 610.

Figure 7:
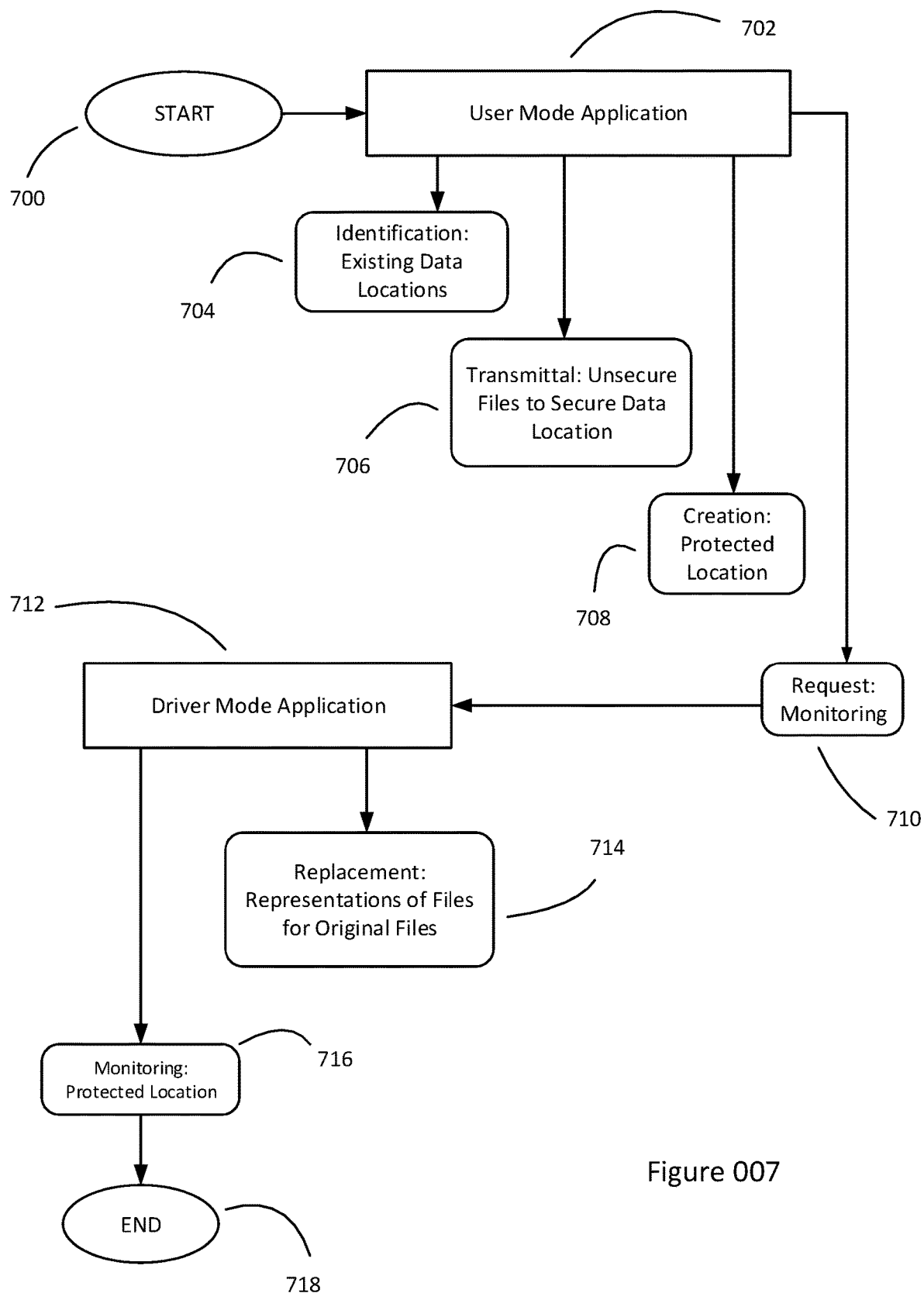
FIG. 7 is a view of the location conversion process consistent with certain embodiments of the present invention.

Turning now to FIG. 7, a view of the location conversion process consistent with certain embodiments of the present invention is shown. The process begins at 700. User Mode Application 702 manages and monitors original data files, and identifies where the original data files are stored. User Mode Application 702 performs Identification of Existing Data Locations at 704; Transmittal of Unsecure Files from Existing Data Locations to Data-Centric Secure Data Storage System Location at 706; and Copying of Original Data and Request of Monitoring of one or more Protected Locations at 710. User Mode Application 702 transmits file content from Data-Centric Secure Data Storage System to a Protected Location via Driver Mode Application 712. The Monitoring Request of 710 is sent to Driver Mode Application 712. In an embodiment, Driver Mode Application 712 introduces a halting/lock-step process on an Operating System accessing original data on the originating hard drive. Driver Mode Application 712 communicates with User Mode Application 702, retrieves original data, performs the Replacement of Original Data Files with Ghost File Representations at 714 and begins Monitoring of Protected Locations at 716. At 718, the process ends.

Figure 8:
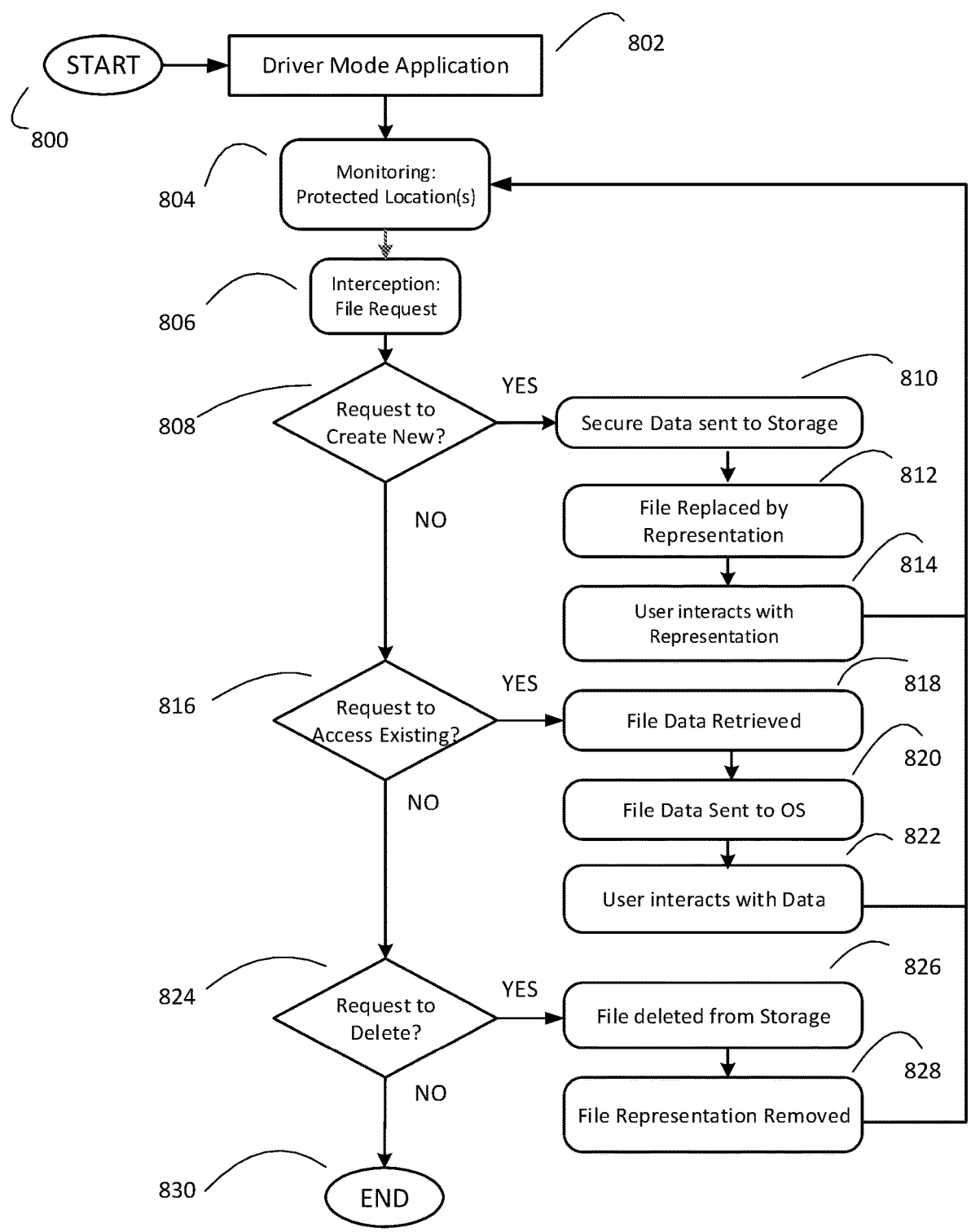
FIG. 8 is a view of the end-user request interception, processing, and fulfillment process consistent with certain embodiments of the present invention.

Turning now to FIG. 8, a view of the end-user request interception, processing, and fulfillment process consistent with certain embodiments of the present invention is shown. The process starts at 800. Driver Mode Application 802 monitors one or more protected locations at 804; Driver Mode Application 802 monitors all file action requests and interacts with Ghost Files. At 806, the Driver Mode Application intercepts Operating System (OS) functions related to creating one or more new files, accessing (including but not limited to opening, saving, and closing) one or more pre-existing files, and deleting one or more files. If at 808 the request is to create a new file, the data and metadata for the new file is sent by the Driver Mode Application to the User Mode Application for transmission at 810 to the Data-Centric Secure Data Storage System. At 812 the Driver Mode Application replaces the newly created file with a Ghost File Representation of the new file. Said Ghost File permits the user at 814 to interact with the file as though it were the original file, without compromising the secure storage of the new file.

If at 816 the request is to access an existing file, the Driver Mode Application requests the content (data and metadata) via the User Mode Application from the Data-Centric Secure Data Storage System at 818. To continue the non-limiting example described in FIG. 7, when the user wishes to save to the original file changes the user has made to the Ghost File, Microsoft Word makes a request to the Operating System to save the data to the file, the Driver Mode Application intercepts the request from the Operating System to write the data to the file and instead writes the data to the protected location, and informs the Operating System that the file has been successfully written to. The Driver Mode Application provides the Ghost File to the Operating System (OS) at 820. In this non-limiting example, the Operating System then tells Microsoft Word that the document has been saved, and Microsoft Word shows the "save complete" notice down at the bottom of the window. At 822 the user interacts with the Ghost File as though it were the original file.

If at 824 the request is to delete an existing file from a protected location, the Driver Mode Application at 828 removes the Ghost File from the protected location. The Driver Mode Application at 826 requests the User Mode Application to delete the original Data File from the Data-Centric Secure Data Storage System. At 830 the process ends.

While certain illustrative embodiments have been described, it is evident that many alternatives, modifications, permutations and variations will become apparent to those skilled in the art in light of the foregoing description.

We claim:

1. A system for secure data storage and retrieval, comprising:

a processor having network connections to a plurality of networked storage locations;

the processor receiving one or more data files from a user through a network connection and creating one or more encrypted data components from said data files;

storing each identifier for each encrypted data component in an electronic storage element associated with said processor;

storing each encrypted data component into one of a plurality of networked storage locations;

the processor creating at least one faithful copy of an encrypted data component based upon an access request from a user;

said at least one faithful copy of encrypted data components are created from encrypted data files stored and retrieved from secure locations defined by an algorithm which calculates the most efficient storage location based at least in part on dynamic parameters of location storage cost, transmission/bandwidth cost, transmission time, security entropy, frequency of access, and location responsiveness;

permitting access to and interaction with each faithful copy of each encrypted data component only via volatile memory;

the processor managing interaction of the user with said faithful copy of each data component to process user requests;

the system capturing all user interaction with said faithful copy of each data component and reflecting said interactions into one or more encrypted data components;

closing and removing all of said faithful copies of each data component from volatile memory when user interaction with said faithful copies of the one or more data component ceases.

2. The system of claim 1, further comprising encryption and decryption of the one or more encrypted data files through the use of two unique keys, where said two unique keys are generated when encryption or decryption is performed, combined using a hashing algorithm, and destroyed once encryption or decryption is complete.

3. The system of claim 1, wherein an algorithm performs management of said faithful copies of data components by reflecting all updates, changes, modifications, and deletions into said encrypted data components based upon user interaction.

4. The system of claim 1, in which multiple (N) storage locations are determined for storage, and from which the system can retrieve and reassemble an entire faithful copy of one or more encrypted data files, even if N-1 of the storage locations are inaccessible, to achieve resiliency across different storage location providers.

5. The system of claim 4, in which the system creates an intermediary position between the user and the encrypted data files through permitting and managing the interaction of said user with the one or more faithful copies of data components derived from said encrypted data files.

6. The system of claim 3, in which the system converts the user interaction with said one or more faithful copies of data components derived from said encrypted data files by capturing all user interaction with said faithful copies of data components and transmitting commands to apply all user interactions to the encrypted data files from which the faithful copies of data components were created.

7. The system of claim 1, in which the system provides for the creation and modification of a set of rule-based criteria for evaluating whether to permit or prevent user access.

8. The system of claim 1, in which the system monitors, records and reports on requests for creating, accessing and deleting data via push messaging, delayed batch reporting, local logging, and remote logging.

9. The system of claim 1, further comprising reassembling said encrypted data component into one or more updated encrypted data components by including all user interaction, recalculating an encrypted data component distribution algorithm and storing said updated encrypted data components in the derived most efficient storage locations.

* * * * *